US011940754B2

(12) United States Patent
Hasegawa et al.

(10) Patent No.: US 11,940,754 B2

(45) Date of Patent: Mar. 26, 2024

(54) CONTAINER MEMBER AND IMAGE FORMING APPARATUS

(71) Applicant: FUJIFILM Business Innovation Corp., Tokyo (JP)

(72) Inventors: Shinya Hasegawa, Kanagawa (JP); Kota Tomioka, Kanagawa (JP); Hiroyuki Tanaka, Kanagawa (JP); Yoichi Yamakawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/556,877

(22) Filed: Dec. 20, 2021

(65) Prior Publication Data

US 2023/0053742 A1 Feb. 23, 2023

(30) Foreign Application Priority Data

Aug. 23, 2021 (JP) ................................ 2021-135486

(51) Int. Cl.
*G03G 21/16* (2006.01)
*G03G 15/00* (2006.01)

(52) U.S. Cl.
CPC ..... *G03G 21/1695* (2013.01); *G03G 15/6502* (2013.01); *G03G 21/1619* (2013.01); *G03G 2215/00379* (2013.01); *G03G 2215/00383* (2013.01); *G03G 2215/00388* (2013.01)

(58) Field of Classification Search
CPC .......... G03G 15/6502; G03G 21/1619; G03G 21/1695; G03G 2215/00379; G03G 2215/00383; G03G 2215/00388
See application file for complete search history.

(56) References Cited

U.S. PATENT DOCUMENTS

2006/0115308 A1* 6/2006 Hattori .............. G03G 15/6502 399/393
2012/0056370 A1* 3/2012 Kobayashi ......... G03G 15/6502 271/171
2013/0049292 A1* 2/2013 Totsuka .................. B65H 1/00 271/164
2018/0162661 A1* 6/2018 Kuroyanagi ........... B65H 29/12

FOREIGN PATENT DOCUMENTS

JP 2003312870 11/2003

* cited by examiner

*Primary Examiner* — Joseph S Wong
(74) *Attorney, Agent, or Firm* — JCIPRNET

(57) ABSTRACT

A container member includes a container body that contains a recording medium and that tilts with respect to a horizontal direction such that a leading edge of the contained recording medium is higher than a trailing edge, a trailing edge restriction portion that comes into contact with the trailing edge of the recording medium that is contained in the container body in a front-rear direction of the recording medium and that restricts a position of the trailing edge of the recording medium, and a restriction portion that restricts movement of the trailing edge in a thickness direction of the recording medium that is contained in the container body.

12 Claims, 7 Drawing Sheets

CONTAINER MEMBER AND IMAGE FORMING APPARATUS

CROSS-REFERENCE TO RELATED APPLICATIONS

This application is based on and claims priority under 35 USC 119 from Japanese Patent Application No. 2021-135486 filed Aug. 23, 2021.

BACKGROUND

(i) Technical Field

The present disclosure relates to a container member that contains a recording medium and an image forming apparatus that includes the container member.

(ii) Related Art

Japanese Unexamined Patent Application Publication No. 2003-312870 discloses that a cassette unit of a paper feeding device is obliquely disposed, a cassette that has the maximum size (for example, A3) is disposed along a diagonal, and cassettes that are smaller than the cassette are disposed above and below the cassette.

SUMMARY

A container member includes a container body that contains a recording medium, and the container body tilts with respect to the horizontal direction in some cases. Specifically, in some cases, the container body tilts with respect to the horizontal direction such that a leading edge of the recording medium is higher than a trailing edge.

The recording medium that is contained in the container body moves downward in a tilt direction with the container body tilting. The trailing edge of the recording medium is attracted to a trailing edge restriction portion that restricts the position of the trailing edge. For this reason, in some cases, the trailing edge of the recording medium that is attracted to the trailing edge restriction portion moves in the thickness direction of the recording medium and crosses over the trailing edge restriction portion.

Aspects of non-limiting embodiments of the present disclosure relate to the case where a trailing edge of a recording medium is inhibited from crossing over a trailing edge restriction portion with a container body tilting such that a leading edge of the contained recording medium is higher than the trailing edge unlike the case where the trailing edge of the recording medium in the thickness direction freely moves.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a container member including a container body that contains a recording medium and that tilts with respect to a horizontal direction such that a leading edge of the contained recording medium is higher than a trailing edge, a trailing edge restriction portion that comes into contact with the trailing edge of the recording medium that is contained in the container body in a front-rear direction of the recording medium and that restricts a position of the trailing edge of the recording medium, and a restriction portion that restricts movement of the trailing edge in a thickness direction of the recording medium that is contained in the container body.

BRIEF DESCRIPTION OF THE DRAWINGS

An exemplary embodiment of the present disclosure will be described in detail based on the following figures, wherein.

DETAILED DESCRIPTION

An example of an image forming apparatus and a container member according to an exemplary embodiment of the present disclosure will be described with reference to FIG. 1 to FIG. 7. An arrow H illustrated in figures represents the height direction of the apparatus that is vertical. An arrow W represents the width direction of the apparatus that is horizontal. An arrow D represents the depth direction of the apparatus that is horizontal.

Entire Configuration of Image Forming Apparatus

Figure 1:
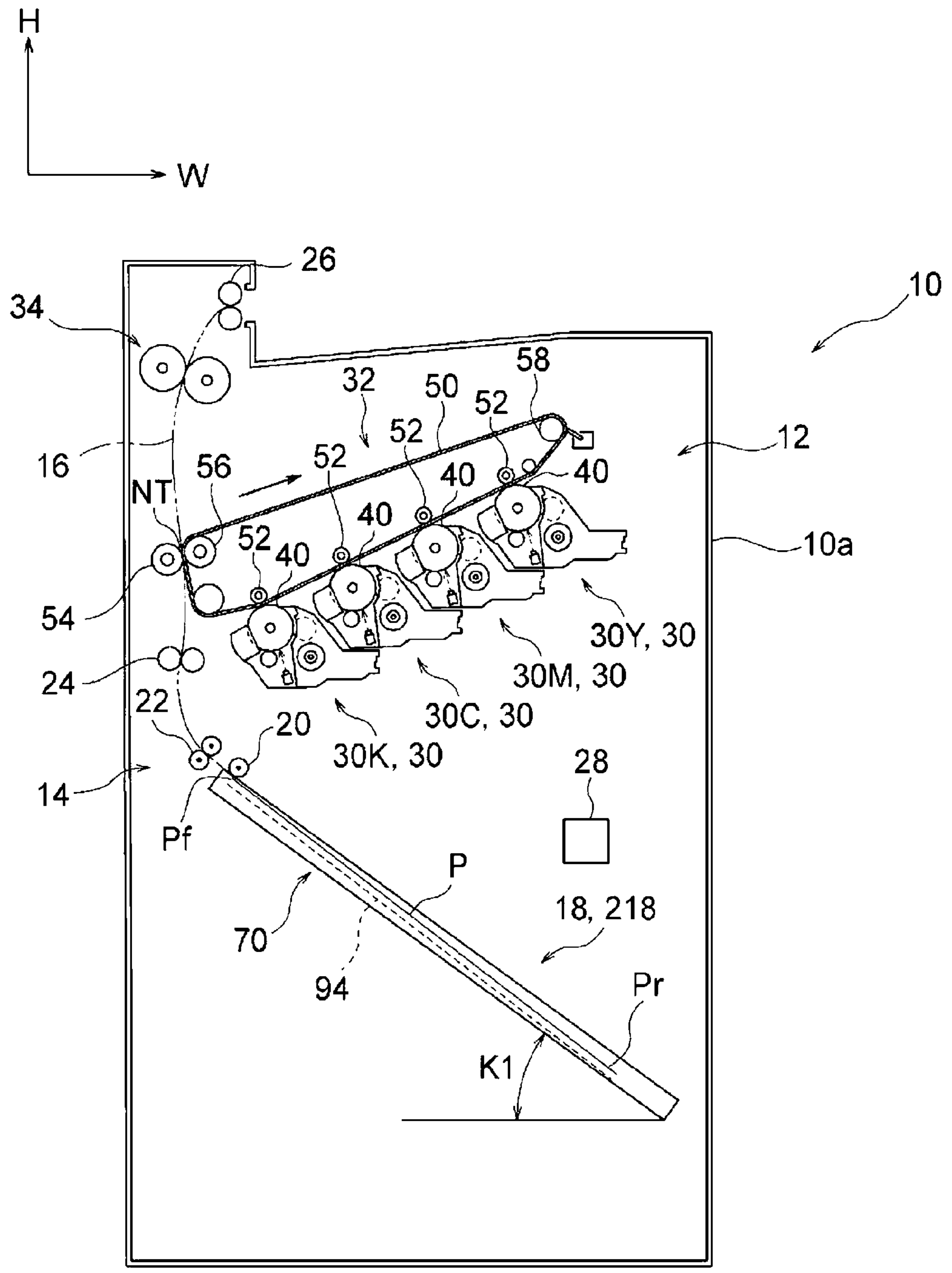
FIG. 1 illustrates the configuration of an image forming apparatus according to an exemplary embodiment of the present disclosure.

As illustrated in FIG. 1, an image forming apparatus 10 includes an image forming unit 12 that forms a toner image by using an electrophotographic system and a transport unit 14 that transports a recording medium P along a transport path 16. The image forming apparatus 10 also includes a container member 18 that contains the recording medium P and a controller 28 that controls components.

As for the image forming apparatus 10 that has the above configuration, the recording medium P is contained in the container member 18, and the recording medium P that is contained in the container member 18 is transported along the transport path 16 by using the transport unit 14. The toner image that is formed by the image forming unit 12 is formed on the transported recording medium P, and the recording medium P on which the toner image is formed is discharged to a location outside an apparatus body 10*a*.

Image Forming Unit 12

As illustrated in FIG. 1, the image forming unit 12 includes multiple toner image forming members 30 that form toner images in respective colors and a transfer member 32 that transfers the toner images that are formed by the toner image forming members 30 to the recording medium P. The image forming unit 12 also includes a fixing device 34 that fixes the toner images that are transferred to the recording medium P by using the transfer member 32 to the recording medium P.

Toner Image Forming Member 30

The toner image forming members 30 are provided so as to form the toner images in the respective colors. According to the present exemplary embodiment, the toner image forming members 30 for four colors of yellow (Y), magenta (M), cyan (C), and black (K) are provided. In the following description, Y, M, C, and K in reference characters are omitted when it is not necessary to distinguish among yellow (Y), magenta (M), cyan (C), and black (K).

Figure 2:
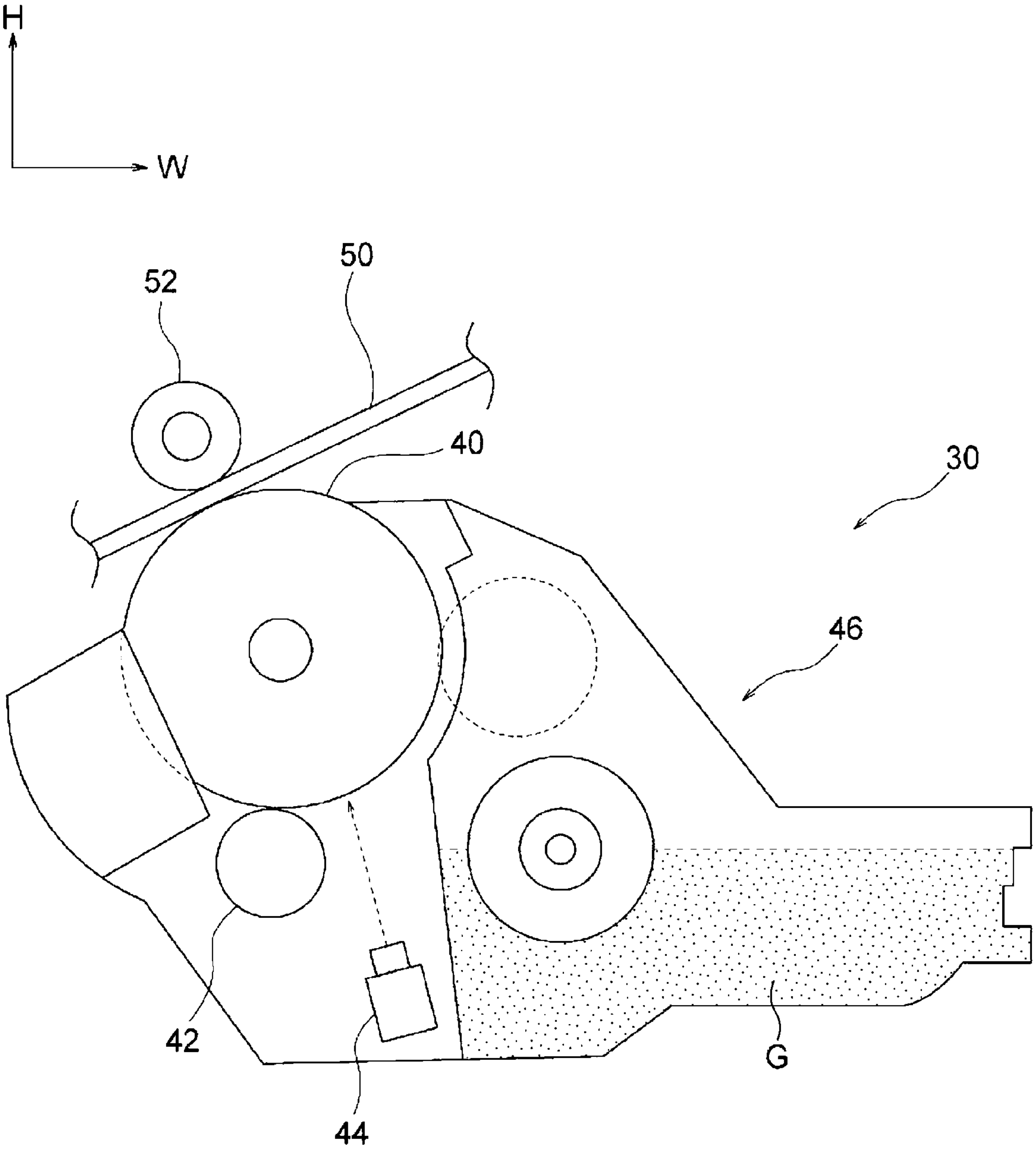
FIG. 2 illustrates the configuration of an image forming unit of the image forming apparatus according to the exemplary embodiment of the present disclosure.

The toner image forming members 30 for the respective colors are basically configured in the same manner except for toner that is used. As illustrated in FIG. 2, each toner image forming member 30 includes an image carrier 40 that is rotatable and that is cylindrical and a charger 42 that charges the image carrier 40. Each toner image forming member 30 also includes an exposure device 44 that radiates exposure light to the image carrier 40 that is charged and forms an electrostatic latent image and a developing device 46 that develops the electrostatic latent image into the toner image by using a developer G that contains the toner. Consequently, the toner image forming members 30 for the respective colors form images in the respective colors by using the toner in the respective colors.

As illustrated in FIG. 1, the image carriers 40 for the respective colors are in contact with a transfer belt 50 (described in detail later) that turns. The toner image forming members 30 for yellow (Y), magenta (M), cyan (C), and black (K) are disposed in this order from an upstream position in the direction in which the transfer belt 50 turns (see an arrow in the figure).

Transfer Member 32

As illustrated in FIG. 1, the transfer member 32 includes the transfer belt 50 and first transfer rollers 52 that are disposed opposite the image carriers 40 for the respective colors with the transfer belt 50 interposed therebetween and that transfer the toner images that are formed by the image carriers 40 for the respective colors to the transfer belt 50.

The transfer member 32 also includes a winding roller 56 around which the transfer belt 50 is wound and a drive roller 58 around which the transfer belt 50 is wound for transmitting rotational force to the transfer belt 50. Consequently, the transfer belt 50 turns in the direction of the arrow in the figure.

The transfer member 32 also includes a second transfer roller 54 that is disposed opposite the winding roller 56 with the transfer belt 50 interposed therebetween and that transfers the toner images that are transferred to the transfer belt 50 to the recording medium P. A transfer nip NT at which the toner images are transferred to the recording medium P is formed between the second transfer roller 54 and the transfer belt 50.

With this configuration, the toner images are first-transferred to the transfer belt 50 in the order of yellow (Y), magenta (M), cyan (C), and black (K) by using the first transfer rollers 52. The second transfer roller 54 transfers the toner images from the transfer belt 50 to the recording medium P that is transported between the transfer belt 50 and the second transfer roller 54. The recording medium P to which the toner images are transferred is transported toward the fixing device 34.

Fixing Device 34

As illustrated in FIG. 1, the fixing device 34 is disposed downstream of the transfer nip NT in the direction in which the recording medium P is transported. The fixing device 34 heats and compresses the toner images that are transferred to the recording medium P and fixes the toner images to the recording medium P.

Transport Unit 14

As illustrated in FIG. 1, the transport unit 14 includes a feed roller 20 that feeds the recording medium P that is contained in the container member 18 to the transport path 16 and prevention rollers 22 that prevent multiple recording media P that are fed by the feed roller 20 from being transported. The feed roller 20 comes into contact with the vicinity of a central portion of a leading edge Pf of the recording medium P and feeds the recording medium P to the transport path 16. The transport unit 14 also includes adjustment rollers 24 that adjust a timing with which the recording medium P is transported to the transfer nip NT and discharge rollers 26 that discharge the recording medium P to which the toner images are fixed by the fixing device 34 to the location outside the apparatus body 10*a*.

Container Member 18

The container member 18 contains the recording medium P. The container member 18 will be described in detail later.

Configuration of Principal Component

The container member 18 will now be described.

Figure 3:
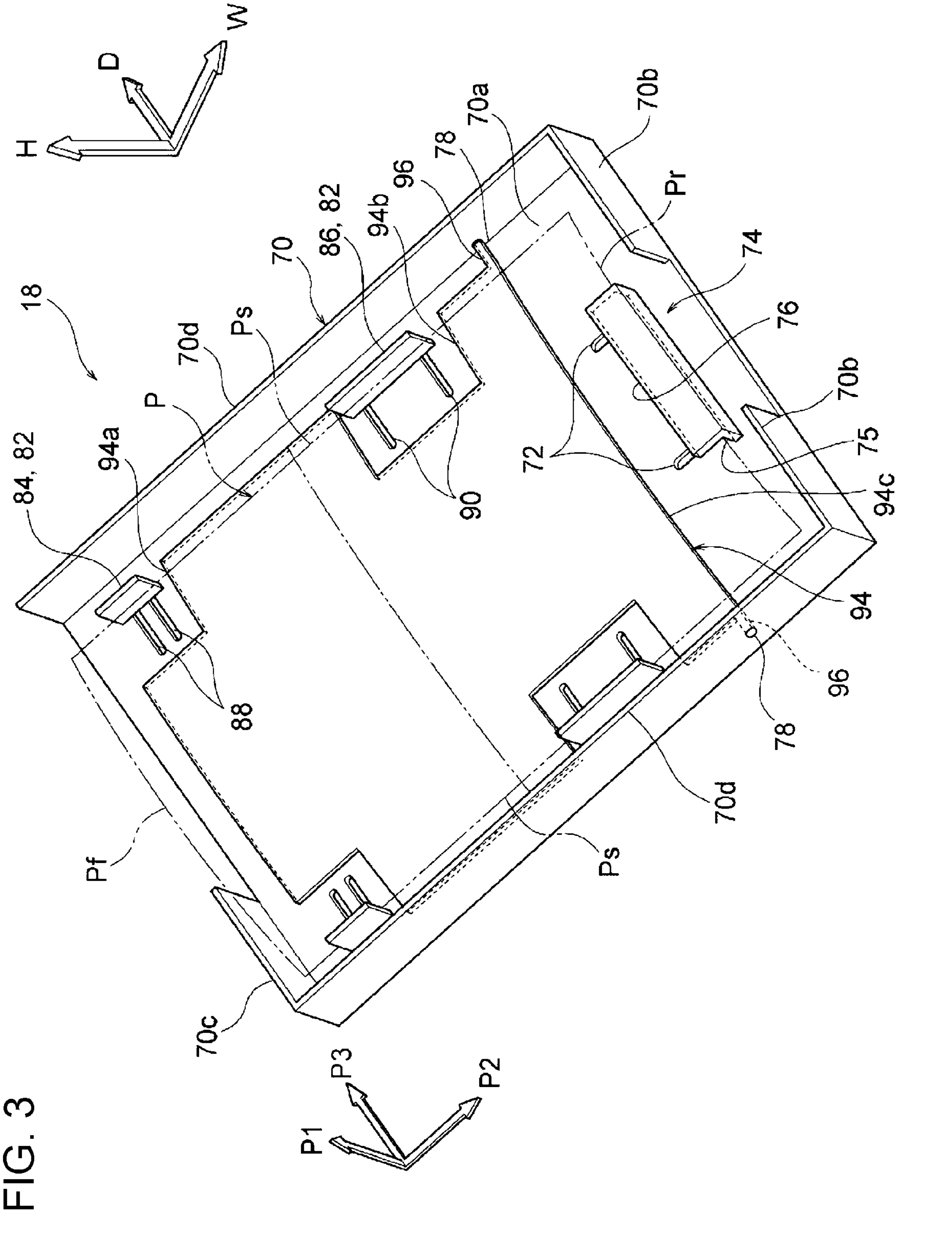
FIG. 3 is a perspective view of a container member according to the exemplary embodiment of the present disclosure.

As illustrated in FIG. 1, the container member 18 is disposed below the toner image forming members 30. As illustrated in FIG. 3, the container member 18 includes a container body 70 that contains the recording medium P, a trailing edge restriction portion 74 that comes into contact with a trailing edge Pr of the contained recording medium P and that restricts the position of the trailing edge Pr of the recording medium P, and two side edge restriction portions 82 that come into contact with respective side edges Ps of the recording medium P and that restrict the positions of the side edges Ps of the recording medium P. The container member 18 also includes a support portion 94 that supports the contained recording medium P from below.

Container Body 70

The container body 70 is installable in and removable from the apparatus body 10*a* via the front of the apparatus body 10*a* and tilts with respect to the horizontal direction such that the leading edge Pf of the contained recording medium P is higher than the trailing edge Pr as illustrated in FIG. 1. According to the present exemplary embodiment, for example, the container body 70 tilts at an angle (an angle K1 in the figure) of no less than 30 degrees and no more than 40 degrees with respect to the horizontal direction.

According to the present exemplary embodiment, the recording medium P is fed to the transport path 16 with the leading edge Pf of the recording medium P facing forward. That is, the "leading edge Pf of the recording medium P" is an edge in the direction in which the contained recording medium P is fed from the container member 18 to the transport path 16, and the "trailing edge Pr of the recording medium P" is an edge opposite the leading edge Pf.

The container body 70 is composed of a resin material and has a box shape that opens upward as illustrated in FIG. 3. The container body 70 includes a bottom plate 70*a* that faces a surface of the contained recording medium P in the thickness direction of the recording medium P (referred to below as a "medium thickness direction") and a rear wall 70*b* that faces the trailing edge Pr of the recording medium P in the front-rear direction of the recording medium P (referred to below as a "medium front-rear direction"). The container body 70 also includes a front wall 70*c* that faces the leading edge Pf of the contained recording medium P in the medium front-rear direction and two side walls 70*d* that face the respective side edges Ps of the recording medium P in the width direction of the recording medium P (referred to below as a "medium width direction"). The "medium thickness direction" coincides with the thickness direction of the recording medium P at a central portion in the medium width direction.

In the figures, the medium thickness direction is illustrated by an arrow P1, the medium front-rear direction is illustrated by an arrow P2, and the medium width direction is illustrated by an arrow P3. According to the present exemplary embodiment, the medium width direction is the same as the depth direction of the apparatus.

Bottom Plate 70*a*

Figure 4:
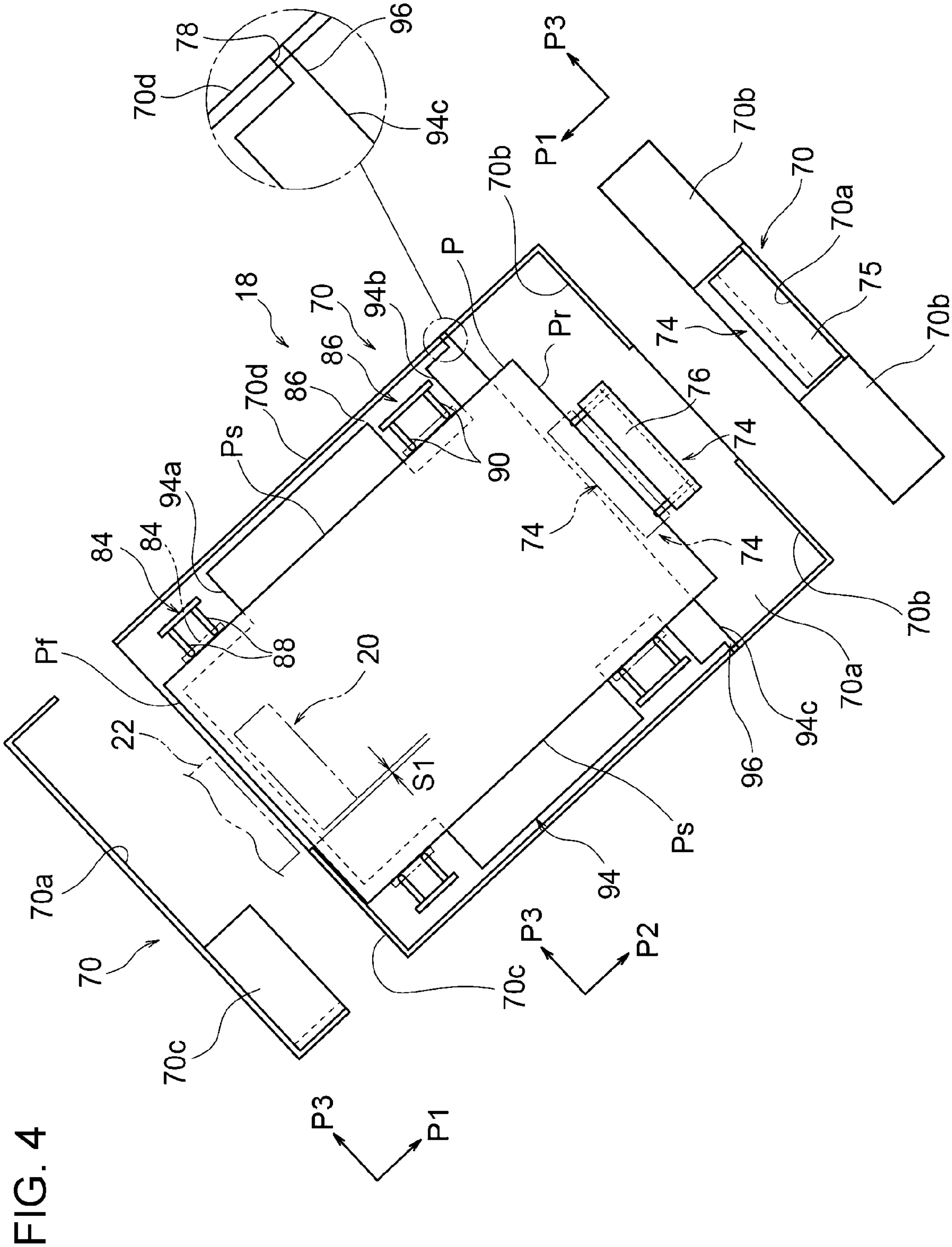
FIG. 4 illustrates the container member according to the exemplary embodiment of the present disclosure viewed in a medium thickness direction.

As illustrated in FIG. 4, the bottom plate 70*a* has a plate shape the thickness direction of which coincides with the medium thickness direction and is rectangular so as to extend in the medium front-rear direction when viewed in the medium thickness direction.

Rear Wall 70*b*

The rear wall 70*b* has a plate shape the thickness direction of which coincides with the medium front-rear direction and is rectangular so as to extend in the medium width direction and so as to have a notch at the central portion in the medium width direction when viewed in the medium front-rear direction.

Front Wall 70*c*

The front wall 70*c* has a plate shape the thickness direction of which coincides with the medium front-rear direction and is rectangular so as to extend in the medium width direction when viewed in the medium front-rear direction. The front wall 70*c* does not extend to one edge of the bottom plate 70*a* in the medium width direction (a right-hand edge in the figure) but extends to the other edge in the medium width direction (a left-hand edge in the figure). The front wall 70*c* releases forward a central portion of the leading edge Pf of the recording medium P. The front wall 70*c* is an example of a leading edge restriction portion.

Consequently, the front wall 70*c* comes into contact with a second end portion of the leading edge Pf of the recording medium P that is contained in the container body 70 and restricts the position of the leading edge Pf of the recording medium P. In other words, the front wall 70*c* comes into contact with a portion of the leading edge Pf of the recording medium P that is contained in the container body 70 except for at least a first end portion and restricts the position of the leading edge Pf of the recording medium P. In other words, the position of the leading edge Pf is restricted with at least the first end portion of the leading edge Pf of the recording medium P that is contained in the container body 70 released forward. The front wall 70*c* comes into contact with the leading edge Pf in a region in which the leading edge Pf and the front wall 70*c* overlap in the medium width direction.

The "end portions of the leading edge Pf of the recording medium P" are portions that extend 2 away from corners when the maximum length of the leading edge Pf of the recording medium P that is containable is 10.

The "central portion of the leading edge Pf of the recording medium P" is a portion of the leading edge Pf within the range of the position at which the feed roller 20 is disposed in the medium width direction. The feed roller 20 comes into contact with the vicinity of the central portion of the leading edge Pf of the recording medium P and feeds the recording medium P to the transport path 16 as described above.

From the perspective of avoidance of interference between the front wall 70*c* and the feed roller 20 in the medium width direction, the distance between the front wall 70*c* and the feed roller 20 (a dimension S1 in FIG. 4) in the medium width direction may be increased. From the perspective of restriction of the position of the leading edge Pf with the front wall 70*c*, the length of a contact between the front wall 70*c* and the leading edge Pf may be increased. In other words, the distance S1 between the front wall 70*c* and the feed roller 20 in the medium width direction may be decreased.

Accordingly, the distance S1 between the front wall 70*c* and the feed roller 20 in the medium width direction is preferably no less than 0.5 mm and no more than 10 mm, more preferably no less than 1 mm and no more than 7 mm, most preferably no less than 2 mm and no more than 5 mm.

Side Wall 70*d*

As illustrated in FIG. 3, the two side walls 70*d* are separated from each other in the medium width direction. The side walls 70*d* have a plate shape the thickness direction of which coincides with the medium width direction and is rectangular so as to extend in the medium front-rear direction when viewed in the medium width direction.

Trailing Edge Restriction Portion 74

As illustrated in FIG. 3, the trailing edge restriction portion 74 is disposed in the container body 70 and is mounted on the bottom plate 70*a* of the container body 70. The trailing edge restriction portion 74 is guided by a pair of slits 72 that is formed in the bottom plate 70*a* and that extends in the medium front-rear direction and moves in a predetermined range in the medium front-rear direction. Movement of the trailing edge restriction portion 74 that moves is restricted by a lock mechanism not illustrated.

Figure 5B:
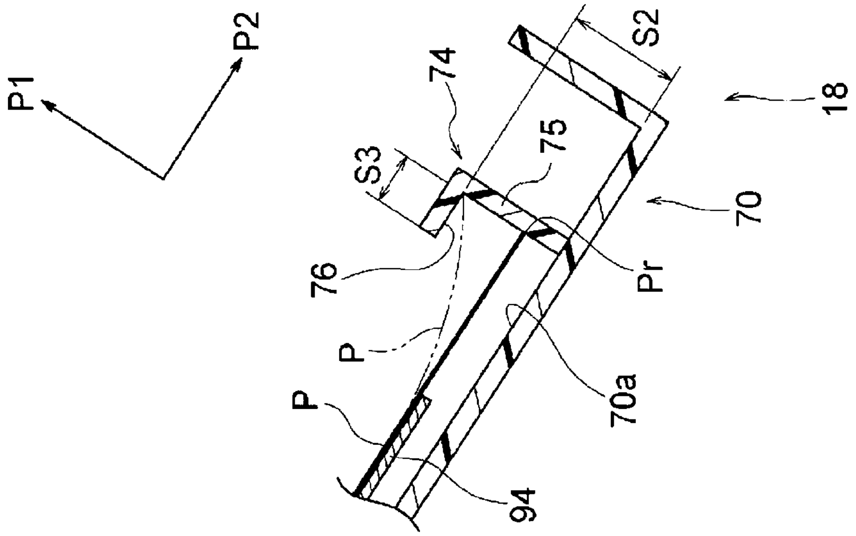
FIG. 5A and FIG. 5B illustrate sectional views of the container member according to the exemplary embodiment of the present disclosure.

The trailing edge restriction portion 74 is composed of a resin material and includes a facing portion 75 that faces the trailing edge Pr of the recording medium P in the medium front-rear direction and that has a plate shape as illustrated in FIG. 5B. The thickness direction of the facing portion 75 coincides with the medium front-rear direction. As illustrated in FIG. 4, the facing portion 75 is rectangular so as to extend in the medium width direction when viewed in the medium front-rear direction. The facing portion 75 corresponds to a wall portion that has a surface that faces forward in the medium front-rear direction.

As illustrated in FIG. 3 and FIG. 5B, the facing portion 75 comes into contact with a portion away from the end portions of the trailing edge Pr of the recording medium P that is contained in the container body 70. The trailing edge restriction portion 74 includes a projecting portion 76 that projects from an upper edge portion of the facing portion 75 forward in the medium front-rear direction and that has a plate shape. Specifically, the projecting portion 76 projects in the medium front-rear direction. The projecting portion 76 is an example of a restriction portion. The projecting portion 76 is not limited by a plate shape but may have another shape, provided that movement of the trailing edge Pr of the recording medium P is restricted.

The thickness direction of the projecting portion 76 coincides with the medium thickness direction. As illustrated in FIG. 4, the projecting portion 76 is rectangular so as to extend in the medium width direction when viewed in the medium thickness direction. The projecting portion 76 projects from the entire upper edge portion of the facing portion 75 in the medium width direction.

With this configuration, the trailing edge restriction portion 74 restricts the position of the trailing edge Pr of the recording medium P in a manner in which the facing portion 75 comes into contact with the trailing edge Pr of the recording medium P that is contained in the container body 70 in the medium front-rear direction. Since the container body 70 tilts with respect to the horizontal direction, the trailing edge Pr of the recording medium P is attracted to the facing portion 75, and the trailing edge Pr moves along a surface of the facing portion 75 in the medium thickness direction in some cases.

In these cases, as illustrated in FIG. 5B, the projecting portion 76 comes into contact with the trailing edge Pr of the recording medium P in the medium thickness direction and consequently restricts movement of the trailing edge Pr of the recording medium P. Specifically, the projecting portion 76 comes into contact with the trailing edge Pr in the medium thickness direction at a portion of the trailing edge Pr that comes into contact with the facing portion 75 in the medium front-rear direction and consequently restricts movement of the trailing edge Pr of the recording medium P. The projecting portion 76 thus functions as a restriction portion that restricts movement of the trailing edge Pr in the medium thickness direction.

According to the present exemplary embodiment, the height of the facing portion 75 (a dimension S2 in FIG. 5B) is 40 mm, and the projection length of the projecting portion 76 (a dimension S3 in FIG. 5B) is 10 mm. That is, when the height of the facing portion 75 is 100, the projection length of the projecting portion 76 is 25. The height S2 of the facing portion 75 is determined such that even when the maximum number of the recording media P are contained, there is a space between the recording media P and the projecting portion 76.

From the perspective of inhibition of movement of the trailing edge Pr of the recording medium P in the medium thickness direction, the projection length S3 of the projecting portion 76 may be increased. From the perspective of putting the recording medium P in the container body 70 from the outside, the projection length S3 of the projecting portion 76 may be decreased.

Accordingly, when the height S2 of the facing portion 75 is 100, the projection length S3 of the projecting portion 76 is preferably no less than 5 and no more than 50, more preferably no less than 10 and no more than 40, most preferably no less than 20 and no more than 30.

Side Edge Restriction Portion 82

As illustrated in FIG. 3, the side edge restriction portions 82 are disposed in the container body 70 and are mounted on the bottom plate 70*a* of the container body 70. The side edge restriction portions 82 include a pair of front restriction portions 84 that is disposed at a front portion of the recording medium P and a pair of rear restriction portions 86 that is disposed at a rear portion of the recording medium P.

Front Restriction Portion 84

The front restriction portions 84 are disposed on both sides of the recording medium P in the medium width direction. The front restriction portions 84 are symmetrical in the medium width direction. Each front restriction portion 84 is guided by a pair of slits 88 that is formed in the bottom plate 70*a* and that extends in the medium width direction and moves in a predetermined range in the medium width direction. The front restriction portions 84 that move stop there due to frictional force that acts between the front restriction portions 84 and the bottom plate 70*a*.

The front restriction portions 84 are composed of a resin material, face the side edges Ps of the recording medium P in the medium width direction, and have a plate shape. The thickness direction of the front restriction portions 84 coincides with the medium width direction. The front restriction portions 84 are rectangular so as to extend in the medium front-rear direction when viewed in the medium width direction. The front restriction portions 84 come into contact with portions of the side edges Ps of the recording medium P that is contained in the container body 70 away from corner portions of the recording medium P.

Rear Restriction Portion 86

The rear restriction portions 86 are disposed on both sides of the recording medium P in the medium width direction. The rear restriction portions 86 are symmetrical in the medium width direction. Each rear restriction portion 86 is guided by a pair of slits 90 that is formed in the bottom plate 70*a* and that extends in the medium width direction and moves in a predetermined range in the medium width direction. The rear restriction portions 86 that move stop there due to frictional force that acts between the rear restriction portions 86 and the bottom plate 70*a*.

The rear restriction portions 86 are composed of a resin material, face the side edges Ps of the recording medium P in the medium width direction, and have a plate shape. The thickness direction of the rear restriction portions 86 coincides with the medium width direction. The rear restriction portions 86 are rectangular so as to extend in the medium front-rear direction when viewed in the medium width direction. The rear restriction portions 86 come into contact with portions of the side edges Ps of the recording medium P that is contained in the container body 70 away from corner portions of the recording medium P.

Other

The container member 18 uses a center registration method. The side edge restriction portions 82 include a mechanism not illustrated, and when one of the front restriction portions 84 or one of the rear restriction portions 86 is moved in the medium width direction, the mechanism moves the other front restriction portion 84 and the other rear restriction portion 86 the same distance in the medium width direction.

With this configuration, the front restriction portions 84 and the rear restriction portions 86 come into contact with the side edges Ps of the recording medium P that is contained in the container body 70 in the medium width direction and consequently restrict the positions of the side edges Ps of the recording medium P.

Support Portion 94

As illustrated in FIG. 3, the support portion 94 is disposed in the container body 70.

The support portion 94 is formed by using a metal plate, is symmetrical in the medium width direction when viewed in the medium thickness direction as illustrated in FIG. 4, and has a shape obtained by notching a rectangle that extends in the medium front-rear direction at four portions.

Specifically, notches 94*a* that have an L-shape and that are used to avoid interference with the front restriction portions 84 that move are formed in a front portion of the support portion 94, and notches 94*b* that have a U-shape and that are used to avoid interference with the rear restriction portions 86 that move are formed in a rear portion of the support portion 94. The position of a rear edge 94*c* of the support portion 94 is determined so as to avoid interference with the trailing edge restriction portion 74 that moves.

Shafts 96 that project in the medium width direction are formed on respective end portions of the rear edge 94*c* of the support portion 94. The shafts 96 are inserted in through-holes 78 that are formed in the respective side walls 70*d* of the container body 70. Consequently, the support portion 94 is rotatable about the shafts 96 such that a front edge portion of the support portion 94 moves up and down.

Figure 5A:
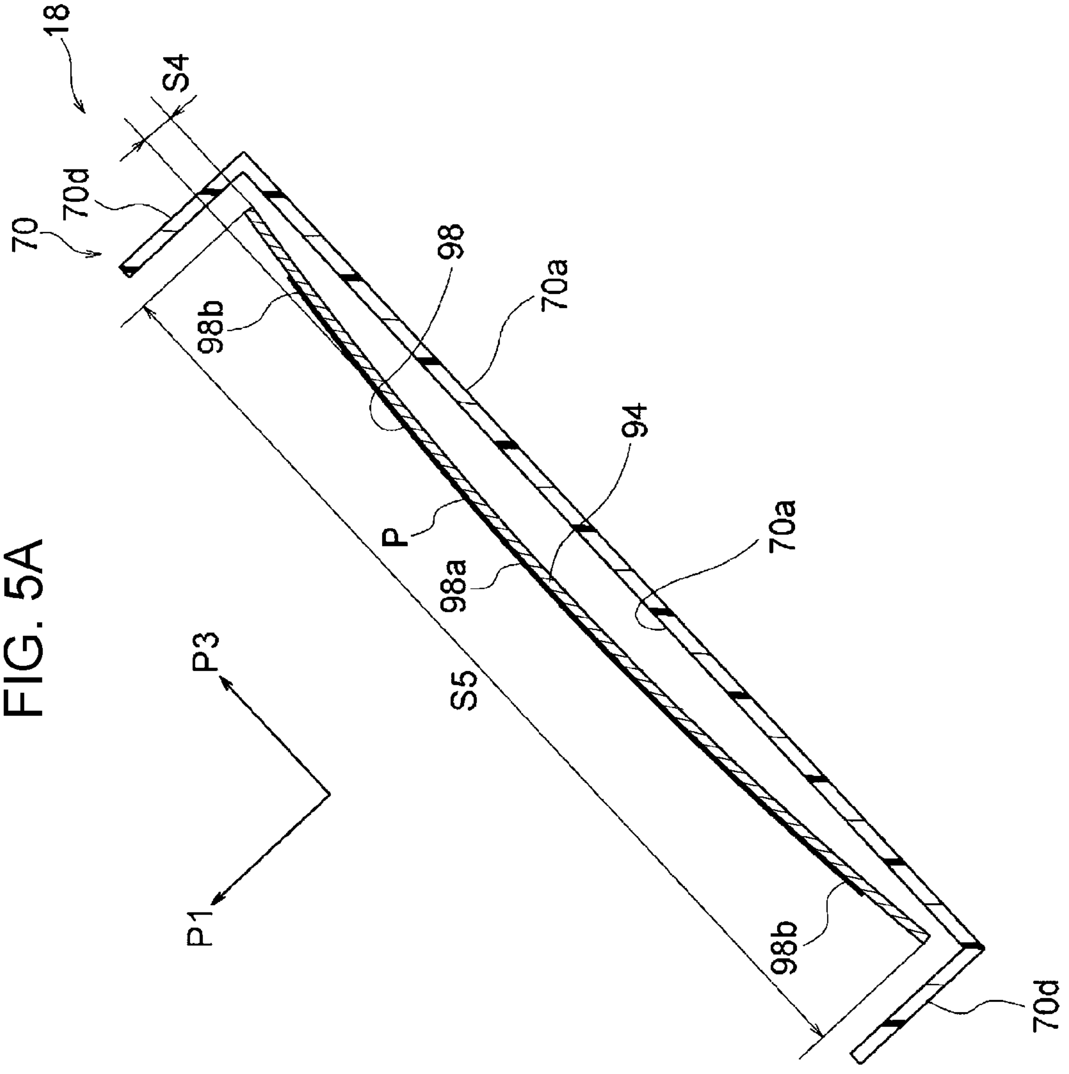

As illustrated in FIG. 5A, the support portion 94 curves such that a central portion in the medium width direction is higher than edge portions when viewed in the medium front-rear direction. In other words, the support portion 94 has a curved surface 98 that is formed such that the central portion in the medium width direction is higher than the edge portions when viewed in the medium front-rear direction.

The central portion of the curved surface 98 in the medium width direction is referred to as a center contact portion 98*a* that comes into contact with a central portion of the recording medium P in the medium width direction. The edge portions of the curved surface 98 in the medium width direction are referred to as edge contact portions 98*b* that come into contact with edge portions of the recording medium P in the medium width direction.

The curved surface 98 that includes the center contact portion 98*a* and the edge contact portions 98*b* are formed over the entire support portion 94 in the medium width direction and over the entire support portion 94 in the medium front-rear direction. The degree of curvature of the curved surface 98 illustrated in FIG. 5A is exaggerated so as to be higher than that of the degree of actual curvature to make the curvature easy to understand.

With this configuration, the recording medium P that is contained in the container body 70 is supported by the support portion 94 from below and curves such that the central portion in the medium width direction is higher than the edge portions when viewed in the medium front-rear direction. The support portion 94 thus functions as a measure that curves the recording medium P.

Figure 6B:
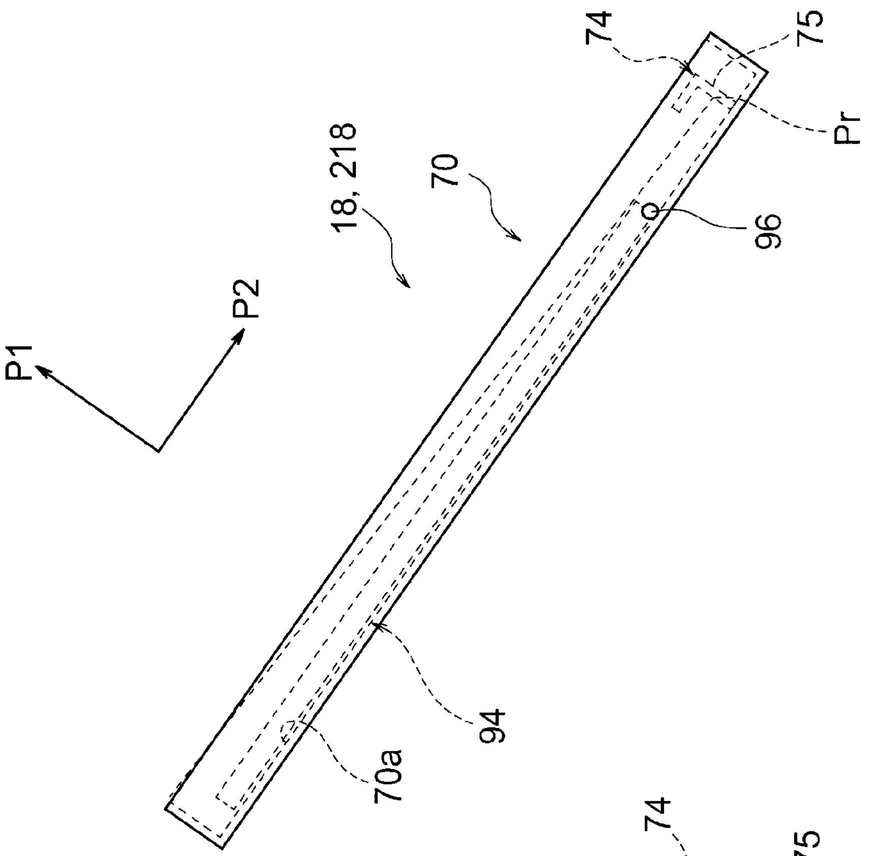
FIG. 6A and FIG. 6B illustrate front views of the container member according to the exemplary embodiment of the present disclosure.
Figure 6A:
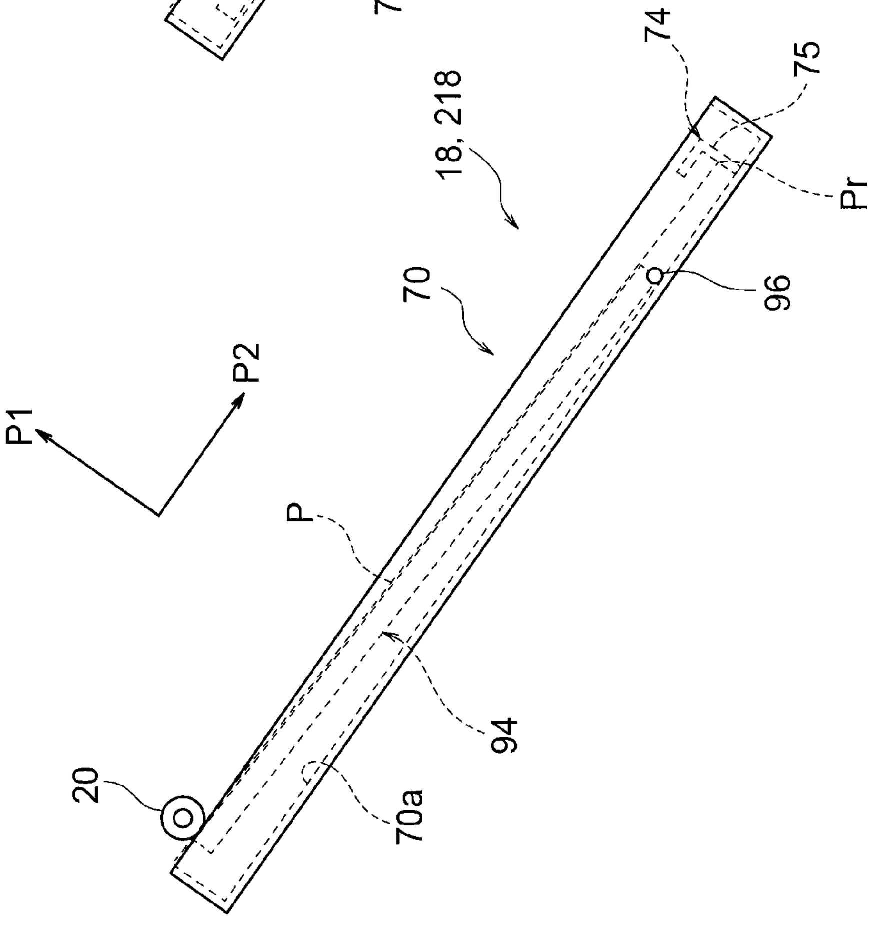

As illustrated in FIG. 6A, the front edge portion of the support portion 94 is urged upward by an urging member that is disposed on the apparatus body 10*a* and that is not illustrated with the container member 18 installed in the apparatus body 10*a* (see FIG. 1), and the support portion 94 turns about the shafts 96. The portion of the leading edge of the recording medium P that is supported by the support portion 94 comes into contact with the feed roller 20.

As illustrated in FIG. 6B, the urging force of the urging member is released, and the front edge portion of the support portion 94 comes into contact with the bottom plate 70*a* of the container body 70 with the container member 18 separated from the apparatus body 10*a* (see FIG. 1). As in the case where the container member 18 is installed in the apparatus body 10*a*, the container body 70 of the container member 18 tilts with respect to the horizontal direction even with the container member 18 separated from the apparatus body 10*a*.

For this reason, it is thought that the trailing edge Pr of the recording medium P that is contained in the container body 70 is attracted to the facing portion 75 with the container member 18 separated from the apparatus body 10*a* and that a portion of the recording medium P near the trailing edge Pr deforms. In this case, the rigidity of the recording medium P may be increased in a manner in which the recording medium P is curved.

According to the present exemplary embodiment, as for a difference in the medium thickness direction between the central portion of the curved surface 98 in the medium width direction and the edge portions of the curved surface 98 (referred to below as the "height of the curved surface 98" illustrated by a dimension S4 in FIG. 5A), the central portion of the curved surface 98 in the medium width direction is higher by 3.2 mm than the edge portions of the curved surface 98 in the medium width direction. The length of the curved surface 98 in the medium width direction (a dimension S5 in FIG. 5A) is 320 mm. That is, when the length of the curved surface 98 in the medium width direction is 100, the height of the curved surface 98 is 1.

From the perspective of the increase in the rigidity of the recording medium P, the height of the curved surface 98 may be increased. In consideration of transport of the recording medium P, the height of the curved surface 98 may be decreased.

Accordingly, when the length of the curved surface 98 in the medium width direction is 100, the height of the curved surface 98 is preferably no less than 0.5 and no more than 2, more preferably no less than 0.7 and no more than 1.5, most preferably no less than 0.9 and no more than 1.2.

Action of Principal Component

The action of the container member 18 will now be described together with the action of a container member 218 in a comparative example. A difference between the container member 218 in the comparative example and the container member 18 will be chiefly described.

Configuration of Container Member 218

Figure 7:
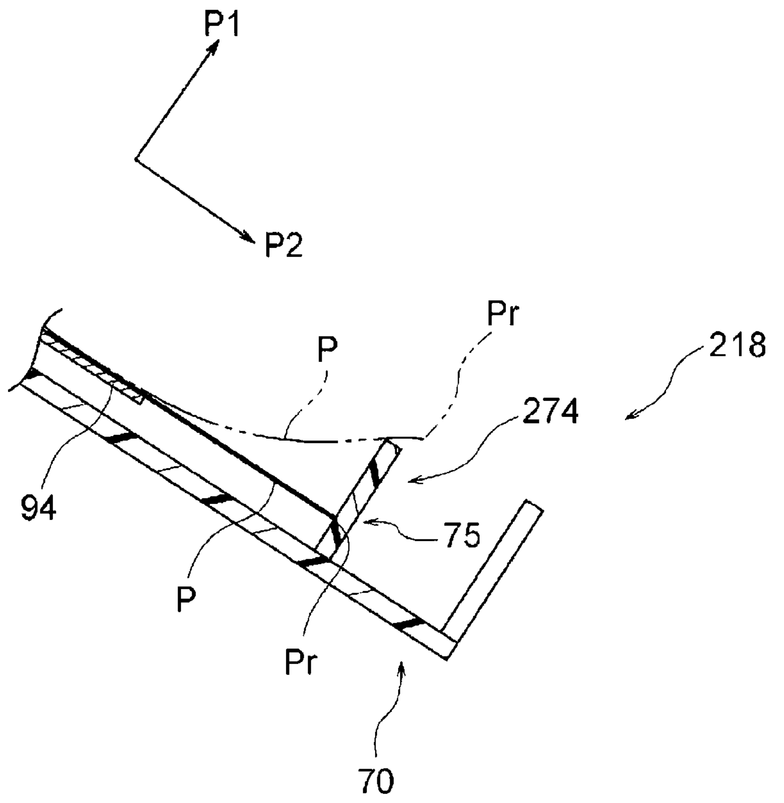
FIG. 7 illustrates a container member in a comparative example to the exemplary embodiment of the present disclosure viewed in the medium thickness direction.

The container member 218 differs from the container member 18 only in including a trailing edge restriction portion 274. As illustrated in FIG. 7, the trailing edge restriction portion 274 of the container member 218 includes the facing portion 75 that faces the trailing edge Pr of the recording medium P in the medium front-rear direction and that has a plate shape. However, the trailing edge restriction portion 274 does not include the projecting portion 76 (see FIG. 5B).

Action of Container Member 18 and Container Member 218

When the recording medium P is put in the container body 70 of the container member 18 or 218 illustrated in FIG. 1, the container member 18 or 218 that is installed in the apparatus body 10*a* is pulled forward in the depth direction of the apparatus, and the container member 18 or 218 is separated from the apparatus body 10*a* (see FIG. 6A and FIG. 6B). As in the case where the container member 18 or 218 is installed in the apparatus body 10*a*, the container body 70 of the container member 18 or 218 tilts with respect to the horizontal direction even with the container member 18 or 218 separated from the apparatus body 10*a*.

The recording medium P that is contained in the container body 70 of the container member 18 or 218 that is separated from the apparatus body 10*a* is likely to move in the tilt direction because the container body 70 tilts with respect to the horizontal direction.

As for the container member 218 in the comparative example, as illustrated in FIG. 7, the facing portion 75 of the trailing edge restriction portion 274 comes into contact with the trailing edge Pr of the recording medium P in the medium front-rear direction, and the trailing edge Pr of the recording medium P is attracted to the facing portion 75. The trailing edge Pr of the recording medium P that is attracted to the facing portion 75 moves in the medium thickness direction along the surface of the facing portion 75 and crosses over the facing portion 75 of the trailing edge restriction portion 274.

As for the container member 18 according to the present exemplary embodiment, as illustrated in FIG. 5B, the trailing edge restriction portion 74 comes into contact with the trailing edge Pr of the recording medium P in the medium front-rear direction, and the trailing edge Pr of the recording medium P is attracted to the facing portion 75. The trailing edge Pr of the recording medium P that is attracted to the facing portion 75 moves in the medium thickness direction along the surface of the facing portion 75. However, the projecting portion 76 comes into contact with the trailing edge Pr of the recording medium P in the medium thickness direction. Specifically, the projecting portion 76 comes into contact with the portion of the trailing edge Pr that comes into contact with the facing portion 75 in the medium front-rear direction. Consequently, movement of the trailing edge Pr is restricted.

CONCLUSION

As for the container member 18, the trailing edge Pr of the recording medium P and the projecting portion 76 come into contact with each other, and consequently, movement of the trailing edge Pr of the recording medium P in the medium thickness direction is restricted as described above.

As for the container member 18, the projecting portion 76 comes into contact with the trailing edge Pr of the recording medium P in the medium thickness direction and restricts movement of the trailing edge Pr. In this way, the trailing edge Pr may be inhibited from crossing over the trailing edge restriction portion 74 more effectively than the case where the projecting portion 76 comes into contact with the trailing edge Pr in a direction that tilts forward with respect to the medium thickness direction.

As for the container member 18, the portion of the trailing edge Pr that comes into contact with the facing portion 75 of the trailing edge restriction portion 74 in the medium front-rear direction and the projecting portion 76 come into contact with each other. In this way, the trailing edge Pr of the recording medium P may be inhibited from crossing over the trailing edge restriction portion 74 due to deformation of the recording medium P more effectively than the case where a portion of the trailing edge Pr that differs from the portion of the trailing edge Pr that comes into contact with the facing portion 75 comes into contact with the projecting portion 76.

As for the container member 18, the projecting portion 76 projects forward in the medium front-rear direction. Consequently, movement of the trailing edge Pr in the medium thickness direction is restricted more effectively than the case where the projecting portion 76 obliquely projects upward with respect to the medium front-rear direction.

As for the container member 18, the projecting portion 76 projects from the entire upper edge portion of the facing portion 75 in the medium width direction. In this way, the trailing edge Pr of the recording medium P may be inhibited from crossing over the trailing edge restriction portion more effectively than the case where the projecting portion 76 projects from a part of the facing portion 75 in the medium width direction.

The image forming apparatus 10 includes the container member 18.

The specific exemplary embodiment of the present disclosure is described in detail. The present disclosure is not limited to the exemplary embodiment. It is clear for a person skilled in the art that the present disclosure includes various exemplary embodiments within the scope of the present disclosure. For example, according to the exemplary embodiment described above, the projecting portion 76 comes into contact with the trailing edge Pr in the medium thickness direction. However, the projecting portion 76 may come into contact with the trailing edge Pr in a direction that tilts forward with respect to the medium thickness direction. However, this case does not take the action that is carried out in a manner in which the projecting portion 76 comes into contact with the trailing edge Pr in the medium thickness direction.

According to the exemplary embodiment described above, the projecting portion 76 comes into contact with the portion of the trailing edge Pr that comes into contact with the facing portion 75 in the medium front-rear direction. The projecting portion 76 may come into contact with a portion of the trailing edge Pr that differs from the portion of the trailing edge Pr that comes into contact with the facing portion 75. For example, the projecting portion may come into contact with rear portions of the side edges Ps of the recording medium P. However, this case does not take the action that is carried out in a manner in which the projecting portion 76 comes into contact with the portion of the trailing edge Pr that comes into contact with the facing portion 75.

According to the exemplary embodiment described above, the projecting portion 76 projects from the upper edge of the facing portion 75 forward in the medium front-rear direction but may project in a tilt direction with respect to the medium front-rear direction. However, this case does not take the action that is carried out with the projecting portion 76 projecting in the medium front-rear direction.

According to the exemplary embodiment described above, the projecting portion 76 projects from the entire upper edge portion of the facing portion 75 in the medium width direction but may project from a part of the facing portion 75 in the medium width direction. However, this case does not take the action that is carried out with the projecting portion 76 projecting from the entire upper edge portion of the facing portion 75.

According to the exemplary embodiment described above, the container member 18 is used for the electrophotographic image forming apparatus 10. However, the container member 18 may be used for, for example, an ink-jet image forming apparatus.

According to the exemplary embodiment described above, the transport unit 14 and the container member 18 may form a container unit although this is not particularly described.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A container member comprising:

a container body that contains a recording medium and that tilts with respect to a horizontal direction such that a leading edge of the contained recording medium is higher than a trailing edge;

a trailing edge restriction portion that comes into contact with the trailing edge of the recording medium that is contained in the container body in a front-rear direction of the recording medium and that restricts a position of the trailing edge of the recording medium, wherein the trailing edge restriction portion is movable and configured to move in a predetermined range in the front-rear direction; and a restriction portion that restricts movement of the trailing edge in a thickness direction of the recording medium that is contained in the container body and comprises a projecting portion projected from the entire upper edge portion of the trailing edge restriction portion to restrict a center of the trailing edge in a width direction of the recording medium.

2. The container member according to claim 1, wherein the restriction portion comes into contact with the trailing edge in the thickness direction and restricts movement of the trailing edge.

3. The container member according to claim 2, wherein the restriction portion comes into contact with a portion of the trailing edge that comes into contact with the trailing edge restriction portion.

4. A container member comprising:

a container body that contains a recording medium and that tilts with respect to a horizontal direction such that a leading edge of the contained recording medium is higher than a trailing edge;

a trailing edge restriction portion that includes a facing portion that faces the trailing edge of the recording medium that is contained in the container body in a front-rear direction of the recording medium, that comes into contact with the trailing edge in the front-rear direction, and that restricts a position of the trailing edge of the recording medium, wherein the trailing edge restriction portion is movable and configured to move in a predetermined range in the front-rear direction; and a projecting portion that is included in the trailing edge restriction portion and that projects from an upper edge portion of the facing portion forward in the front-rear direction, wherein the projecting portion projects from the entire upper edge portion of the facing portion in a width direction of the recording medium, so that the projecting portion contacts a center of the trailing edge of the recording medium in a width direction.

5. The container member according to claim 4, wherein the projecting portion projects in the front-rear direction.

6. An image forming apparatus comprising:

the container member according to claim 1;

a transport unit that transports the recording medium that is contained in the container member; and an image forming unit that forms an image on the recording medium that is transported by the transport unit.

7. An image forming apparatus comprising:

the container member according to claim 2;

a transport unit that transports the recording medium that is contained in the container member; and an image forming unit that forms an image on the recording medium that is transported by the transport unit.

8. An image forming apparatus comprising:

the container member according to claim 3;

a transport unit that transports the recording medium that is contained in the container member; and an image forming unit that forms an image on the recording medium that is transported by the transport unit.

9. An image forming apparatus comprising:

the container member according to claim 4;

a transport unit that transports the recording medium that is contained in the container member; and an image forming unit that forms an image on the recording medium that is transported by the transport unit.

10. An image forming apparatus comprising:

the container member according to claim 5;

a transport unit that transports the recording medium that is contained in the container member; and an image forming unit that forms an image on the recording medium that is transported by the transport unit.

11. An image forming apparatus comprising:

the container member according to claim 1;

a transport unit that transports the recording medium that is contained in the container member; and an image forming unit that forms an image on the recording medium that is transported by the transport unit.

12. A container member comprising:

containing means for containing a recording medium, the containing means tilting with respect to a horizontal direction such that a leading edge of the contained recording medium is higher than a trailing edge;

means for coming into contact with the trailing edge of the recording medium that is contained in the containing means in a front-rear direction of the recording medium and configured to move in a predetermined range in the front-rear direction for restricting a position of the trailing edge of the recording medium; and means for restricting movement of the trailing edge in a thickness direction of the recording medium that is contained in the containing means, and comprises a projecting portion projected from the entire upper edge portion of the trailing edge restriction portion for restricting a center of the trailing edge in a width direction of the recording medium.

* * * * *